United States Patent [19]

Zommer

[11] Patent Number: 5,191,279
[45] Date of Patent: Mar. 2, 1993

[54] CURRENT LIMITING METHOD AND APPARATUS

[75] Inventor: Nathan Zommer, Los Altos, Calif.

[73] Assignee: Ixys Corporation, San Jose, Calif.

[21] Appl. No.: 494,198

[22] Filed: Mar. 15, 1990

[51] Int. Cl.⁵ ................................................ G05F 1/00
[52] U.S. Cl. .................................. 323/354; 323/273; 323/282; 323/351
[58] Field of Search ............... 323/311, 312, 354, 282, 323/273, 349, 351; 338/195; 361/18, 58, 104

[56] References Cited

U.S. PATENT DOCUMENTS

| | | | |
|---|---|---|---|
| 4,016,483 | 4/1977 | Rudin | 323/74 |
| 4,364,006 | 12/1982 | Makabe et al. | 323/353 |
| 4,412,241 | 10/1983 | Nelson | 323/354 |
| 4,713,599 | 12/1987 | Davis | 323/312 |
| 4,766,366 | 8/1988 | Davis | 323/312 |
| 4,860,072 | 8/1989 | Zommer | |
| 4,868,416 | 9/1989 | Fitzpatrick et al. | 323/311 |
| 4,978,904 | 12/1990 | Fitzpatrick et al. | 323/354 X |

FOREIGN PATENT DOCUMENTS

| | | | |
|---|---|---|---|
| 0050948 | 4/1979 | Japan | 323/312 |
| 0087224 | 5/1982 | Japan | 323/311 |

OTHER PUBLICATIONS

IBM Technical Disclosure Bulletin, vol. 13, No. 11, Apr. 1971, pp. 3549–3550, H. Ottesen.

Evans, *Designing with Field-Effect Transistors* (1981) pp. 245–254.

*Primary Examiner*—Emanuel T. Voeltz
*Attorney, Agent, or Firm*—Townsend and Townsend

[57] ABSTRACT

A method and apparatus for providing a substantially constant current from a voltage source. The apparatus includes a depletion mode transistor connected to a parallel network of resistors. At least one of the resistors is provided with a series fusible link so as to enable removal of one or more of the resistors from the network and adjust the output of the current limiter to a desired value.

12 Claims, 2 Drawing Sheets

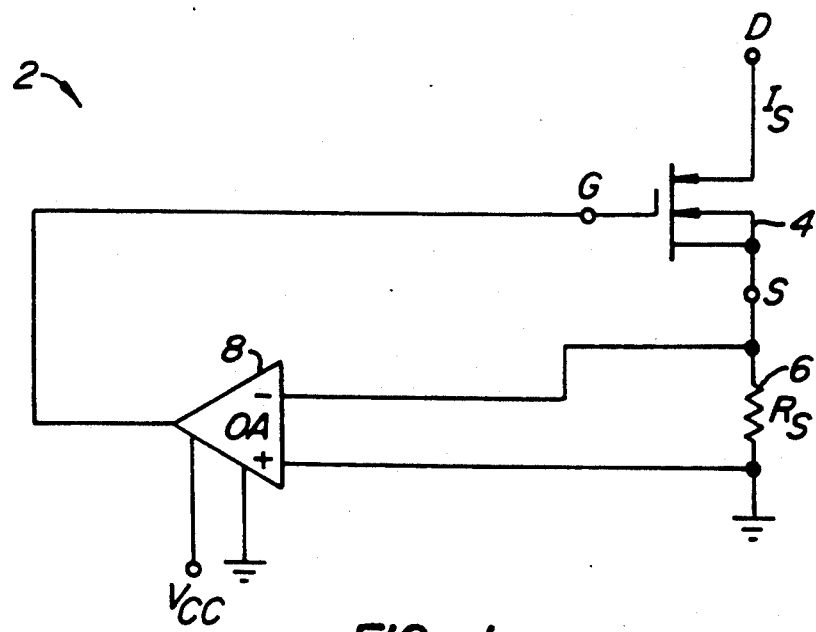
FIG._1.
PRIOR ART
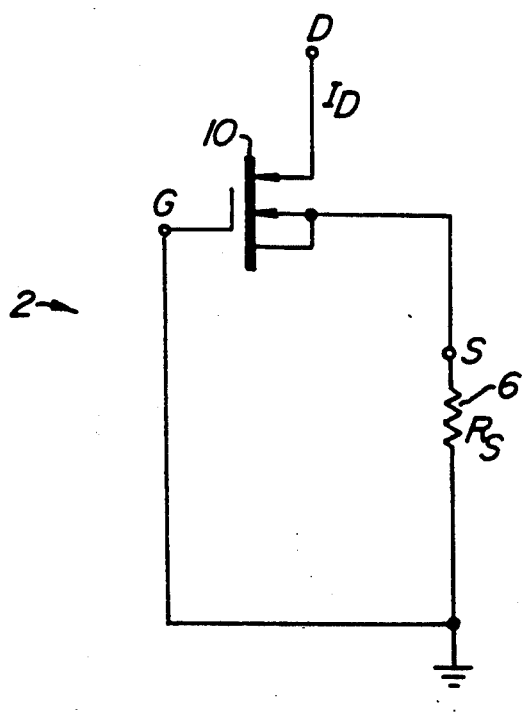
FIG._2.
PRIOR ART

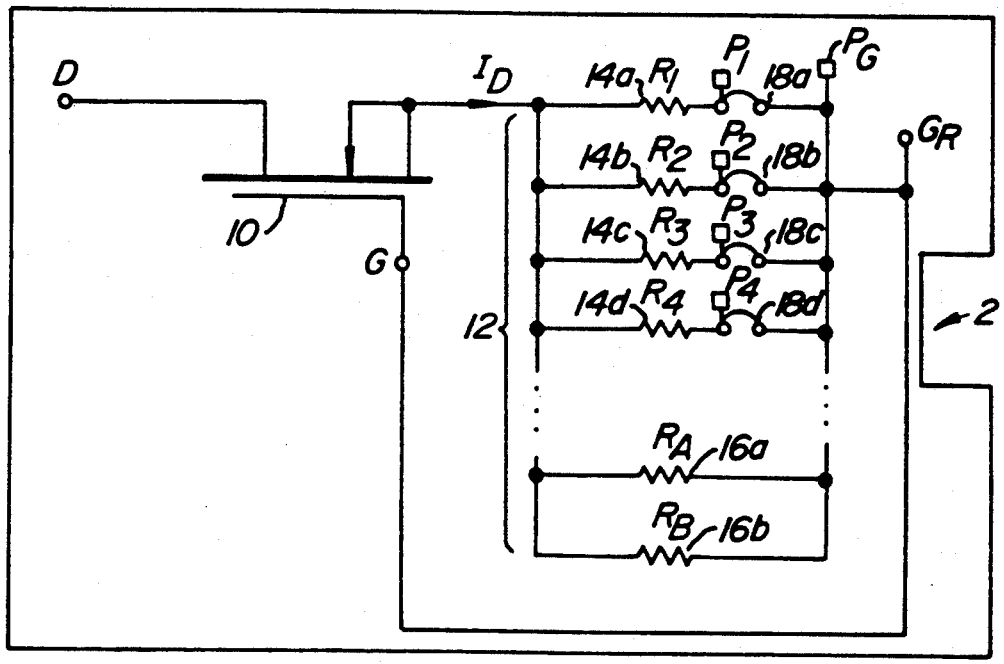
FIG._3.
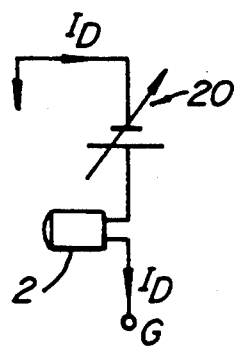
FIG._4.
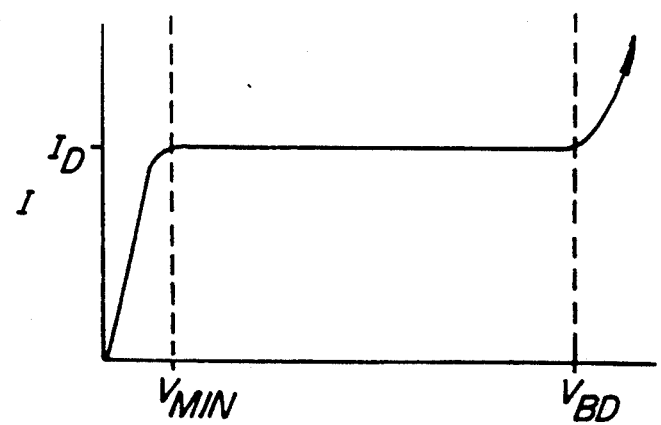
FIG._5.

5,191,279

CURRENT LIMITING METHOD AND APPARATUS

BACKGROUND OF THE INVENTION

The present invention relates to the field of electronic devices and their manufacture. More specifically, in one embodiment the invention provides a method and apparatus for limiting current flow for the purpose of, for example, protection, control, signal generation, and the like.

Often it is desirable to provide a means and method for limiting current from a variable voltage source in an electronic circuit. Such current limiters (otherwise referred to as current regulators, current sinks, constant current sources, and the like) could be used in a wide variety of applications which include, but are by no means limited to, protection, control, signal generation.

Ideally, a current limiter provides an output current which is largely independent of an input voltage. In reality, most such devices do not begin to operate effectively until the voltage between their terminals reaches some minimum voltage, generally referred to as $V_t$. Their performance begins to deteriorate above some breakdown voltage, $V_{bd}$.

FIG. 1 illustrates a typical current limiting device 2. The current $I_s$ is to be regulated. The current limiting device includes an enhancement mode HVFET 4 which is driven in a closed loop mode via a shunt resistor 6 and an amplifier 8. The current $I_s$ will, within limits, be set by the resistance of the shunt resistor 6 and will be largely independent of the voltage applied at the point "D". $I_s$ will equal approximately $V_t/R_s$, where $V_t$ is roughly the threshold voltage of the FET 4. Such current limiting devices have the disadvantage of, for example, being complex. In the device shown in FIG. 1, for example, it is necessary to provide a power supply for $V_{cc}$, an op-amp 8, a transistor 4, a resistor 6, and the like.

FIG. 2 illustrates another type of current source in which a depletion mode FET 10 is utilized. In the device shown in FIG. 2, the current is "on" when the gate of the FET is shorted to the source. $I_D$ is set by processing conditions in the fabrication of the device and, in particular, the design of the FET and the resistors. Accordingly, users of such devices frequently purchase a transistor 10 and select a discrete resistor 6 to provide the appropriate current $I_D$. Often, for different transistors, even those fabricated in the same production facility, it is found that different values of $R_s$ must be provided to obtain a desired value of $I_d$.

An improved method and apparatus for providing a constant current is desired.

SUMMARY OF THE INVENTION

An improved method and apparatus for providing a substantially constant current over a wide range of voltages is disclosed herein. The current source provides a precise value of current in mass-produced devices, even when the devices are fabricated under widely varying process conditions. Further, the device is straightforward and inexpensive to manufacture.

Accordingly, in one embodiment the invention comprises a transistor for controlling a first current from a voltage source; and a resistive network attached to an output of the transistor, the resistive network comprising at least one resistive element in series with a fusible link, the fusible link providing an open circuit upon application of a voltage across the fusible link, and a control element of the transistor connected to an output of the resistive network.

A method of adjusting a current output from a current limiter is also disclosed. The current limiter includes a depletion mode transistor connected to a voltage source at a first end and a resistive network at a second end. The network includes at least two resistors in parallel, each of the resistors in series with a fusible link. An output of the network is connected to a gate of the depletion mode transistor. The output of the current limiter is adjusted by selectively removing at least one of the resistors from operation in the network by applying a voltage across a fusible link associated with the at least one resistor.

In another embodiment the apparatus for providing a substantially constant current from a varying voltage source includes a depletion mode transistor having a drain end connected to the varying voltage source and a source end; a network of resistors on a common die with the depletion mode transistor and connected to the source end, the network of transistors comprising: a first set of resistors in the network, the first set of resistors connected in parallel, each of the first set of resistors provided with a fusible link, the fusible links provided with a connection to a die pad for applying a voltage to open the fusible link; and a constant resistor, the constant resistor connected in parallel with the first set of resistors.

A further understanding of the nature and advantages of the inventions herein may be realized by reference to the remaining portions of the specification and the attached drawings.

BRIEF DESCRIPTION OF THE DRAWINGS

FIG. 1 illustrates a circuit diagram of a prior art current limiter;

FIG. 2 illustrates a circuit diagram of a second prior art current limiter;

FIG. 3 is a current limiter according to one embodiment of the invention herein;

FIG. 4 illustrates the final form and use of the current limiter according to one embodiment of the invention; and FIG. 5 illustrates a current versus voltage curve for one embodiment of the invention.

DESCRIPTION OF THE PREFERRED EMBODIMENTS

FIG. 3 illustrates one embodiment of the invention provided herein. A current limiter 2 is provided with a transistor 10 which in a preferred embodiment is a field effect transistor of the type commonly known to those of skill in the art. In the embodiment shown in FIG. 3, the transistor 10 is a depletion mode transistor, i.e., a transistor in which there is a conducting channel between the source and the drain when the gate and source are at the same potential. While an n-channel device is shown in FIG. 3, it will be readily apparent upon review of this disclosure that current limiters based on p-channel devices could also be fabricated. Also, while a two-pin device is illustrated in FIG. 3, a three-pin device could also be readily fabricated based upon this disclosure.

The source of the depletion mode transistor 10 is connected to a parallel network of shunt resistors 12. The parallel network of shunt resistors 12 includes a first group of resistors 14a, 14b, 14c, and 14d. Optionally, the network may also include a second group of fixed resistors 16a and 16b. It is preferred to provide optional resistors 16 so the device will provide a limit on current even if all the fusible links are blown. The gate of the depletion mode transistor is connected to the output of the network 12. Each of the first group of resistors is provided with a series fusible link 18a, 18b, 18c, and 18d while the optional resistors 16a and 16b are not provided with such a link.

The invention is illustrated herein with 4 fused resistors and 2 fixed resistors, but of course a wide variety of arrangements could be provided. In general it is desirable to provide 2 or more fused resistors in the network and 1 or more fixed resistors. The selection of the number of resistors provided in the network will be based on the range of current values which the current limiter is intended to cover. Also, while the invention is illustrated herein with regard to discrete resistors 14 and 16, it will be recognized that each of these discrete resistors could actually include one or more resistors or other load devices in series or parallel.

The value of resistance to be supplied for each resistor will also vary widely depending upon the application. The resistance values may range from about 10 ohms to 100,000 ohms or more in some applications. More particularly, resistance values may range from about 100 ohms to 10,000 ohms in some applications. Still more particularly, resistance values may range from about 200 ohms to 8,000 ohms in typical applications. These values are meant to be illustrative and in no way limiting on the resistance values used in actual applications.

When it is desirable to mass-produce current limiters, all of which provide a nearly identical output, the resistors will be used to account for variations in the fabrication of the device as a result of changing process conditions and the like. In this situation, the values of resistance provided by at least several of the resistors will be closely spaced. For example, resistances varying by between about 10% and 1000% would be used in some embodiments with resistances varying between about 50% and 100% preferred. Of course, the invention will find other applications. For example, the invention may be utilized to fabricate current limiters which may be used to provide widely varying current outputs. In this case, the resistance of the various resistors could vary by 1000% or more.

In operation, the resistor network 12 is used to vary the output current by selectively blowing one or more of the fuses. The fuses are blown by applying an appropriate voltage across the fusible links via on-chip trimming pads or pins $P_1$, $P_2$, $P_3$, and/or $P_4$, and the ground pad or pin $P_g$. By providing on-chip trim pads, the output of the current limiter may be precisely adjusted in the fab during a wafer testing operation. In some cases, it may be desirable to allow a customer to select an output current of the device after purchase, in which case a multi-pin package (e.g., 6 pins, with four pins connected to trimming pads and two pins for input/output) would be utilized. The customer would, in some embodiments, selectively blow fuses in sequence until the desired current is output. In still further embodiments, fuses may be blown with lasers, ultrasonic pulses, or the like.

FIG. 4 provides an illustration of the device 2 in a two-pin configuration. The device is connected to a source of variable voltage 20, but provides a constant current $I_d$. The output characteristics of the device are illustrated in FIG. 5. As shown, the device output reaches $I_D$ at $V_{min}$, after which its output is largely independent of applied voltage up to a breakdown voltage $V_{bd}$. In common devices fabricated using present fabrication technology, $V_{min}$ is typically 3–4 volts while $V_{bd}$ is 100 to 1200 volts.

The device discussed above may be produced by way of a large variety of fabrication sequences. The device may, for example, be fabricated according to the method described in U.S. Pat. No. 4,860,072, which is incorporated herein by reference for all purposes.

In a preferred embodiment the device is fabricated by way of a process in which resistors for the resistance network may be fabricated without additional masking steps. In this process polysilicon resistors are utilized and the same polysilicon that is used for the gate is used for the resistor network such as in, for example, U.S. Pat. No. 4,764,480, which is incorporated herein by reference for all purposes. The preferred resistor is a p-well resistor (for the n-channel device), since the temperature coefficient of the resistor compensates and cancels the effect of the temperature on the gain of the FET thus keeping the current level constant to a high degree with temperature.

It is to be understood that the above description is intended to be illustrative and not restrictive. Many variations of the invention will become apparent to those of skill in the art upon review of this disclosure. Merely by way of example, the invention has been illustrated primarily with regard to n-channel transistors, but the invention could readily be adapted to utilize p-channel transistors. The scope of the invention should, therefore, be determined not with reference to the above description, but instead should be determined with reference to the appended claims along with their full scope of equivalents.

What is claimed is:

1. Apparatus for providing a substantially constant current from a voltage source comprising:
   a) a field effect transistor for controlling a current from a voltage source; and
   b) a resistive network attached to a terminal of said transistor, said resistive network comprising at least one resistive element in series with a fusible link, said fusible link providing an open circuit upon application of a voltage across said fusible link, a control element of said transistor connected to an output of said resistive network, said resistive network and said transistor also being fabricated on a single die.

2. Apparatus for providing a substantially constant current from a voltage source as recited in claim 1 wherein said resistive network comprises a plurality of resistors in parallel, said plurality of resistors each provided with a fusible link.

3. Apparatus for providing a substantially constant current from a voltage source as recited in claim 1 further comprising a second resistive element in parallel with said at least one resistive element, said second resistive element connected to said network with a non-fusible link.

4. Apparatus for providing a substantially constant current from a voltage source as recited in claim 1 further comprising a second resistive element in parallel with said at least one resistive element, said second resistive element connected to said network with a non-fusible link, wherein said resistive network comprises a plurality of resistors in parallel, said plurality of resistors each provided with a fusible link.

5. Apparatus for providing a substantially constant current from a voltage source as recited in claims 1, 2, 3 or 4 wherein said transistor is a depletion mode MOSFET.

6. Apparatus for providing a substantially constant current from a voltage source as recited in claim 1 wherein said fusible link further comprises a first end and a second end, said first end connected to a die pad.

7. Apparatus for providing a substantially constant current from a voltage source as recited in claim 6 wherein said second end is connected to ground.

8. Apparatus for providing a substantially constant current from a voltage source as recited in claim 1 wherein said fusible link further comprises a first end and a second end, said first end connected to a package pin.

9. Apparatus for providing a substantially constant current from a voltage source as recited in claim 2 wherein said resistors have resistances varying between about 50% and 800%.

10. Apparatus for providing a substantially constant current from a voltage source as recited in claim 2 wherein said resistors have resistances varying between about 10 ohms and 100,000 ohms.

11. Apparatus for providing a substantially constant current from a voltage source consisting essentially of:
    a) a transistor for controlling a current from a voltage source; and
    b) a resistive network attached to an output of said transistor, said resistive network including at least two resistive elements each in series with a fusible link, said fusible link providing an open circuit upon application of a voltage across said fusible link, a control element of said transistor connected to an output of said resistive network, said at least two resistive elements arranged in parallel.

12. Apparatus for providing a substantially constant current from a varying voltage source comprising:
    a) a depletion mode transistor having a drain end connected to said varying voltage source and a source end; and
    b) a network of resistors on a common die with said depletion mode transistor and connected to said source end, said network of resistors comprising:
        i) a first set of resistors in said network, said first set of resistors connected in parallel, each of said first set of resistors provided with a fusible link, said fusible links provided with a connection to a die pad for applying a voltage to open said fusible link; and
        ii) a constant resistor, said constant resistor connected in parallel with said first set of resistors.

* * * * *